United States Patent [19]

Drent

[11] Patent Number: 4,740,625

[45] Date of Patent: Apr. 26, 1988

[54] CATALYST COMPOSITIONS AND A PROCESS FOR POLYMERIZING CARBON MONOXIDE AND OLEFINS

[75] Inventor: Eit Drent, Amsterdam, Netherlands

[73] Assignee: Shell Oil Company, Houston, Tex.

[21] Appl. No.: 49,756

[22] Filed: May 13, 1987

[30] Foreign Application Priority Data

May 13, 1986 [NL] Netherlands .................. 8601198

[51] Int. Cl.$^4$ ............................................. C07C 45/49
[52] U.S. Cl. .................................... 568/387; 528/392
[58] Field of Search ......................... 568/387; 528/392

[56] References Cited

U.S. PATENT DOCUMENTS

| | | | |
|---|---|---|---|
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 3,914,391 | 10/1975 | Nozaki | 423/364 |
| 3,919,272 | 11/1975 | Knifton | 260/410.9 |
| 3,984,388 | 10/1976 | Shryne | 260/63 |
| 4,076,911 | 2/1978 | Fenton | 526/11.1 |
| 4,474,978 | 10/1984 | Drent | 560/24 |
| 4,634,793 | 1/1987 | Drent | 560/243 |

FOREIGN PATENT DOCUMENTS

| | | | |
|---|---|---|---|
| 121965 | 8/1984 | European Pat. Off. | 568/387 |
| 181014 | 5/1986 | European Pat. Off. | 568/387 |
| 213671 | 3/1987 | European Pat. Off. | 568/387 |
| 2046968 | 10/1964 | Japan | 568/387 |
| 74048406 | 3/1969 | Japan | 568/387 |
| 1081304 | 3/1965 | United Kingdom | 568/387 |
| 2058074 | 8/1979 | United Kingdom | 568/387 |

OTHER PUBLICATIONS

Kirk-Othmer Encyclopedia of Chemical Technology, Second Edition, vol. 12, p. 132, 1967.
Organometallics 1984, 3, 866-870.
Encyclopedia of Polymer Science and Technology, 1968, vol. 9, 397-402.
Proc. Ind. Assoc. Cult. Sci. 1985, 68B, 1-5.
J. Am. Chem. Soc. 1982, 104, 3520-2.
Tetrahedron Lett. 1971, 26, 2409-2412.
Chemtech 1986, 1, 48-51.
Adv. Polym. Sci. 1986, 73-4, 125-44.
J. Organomet. Chem. 1985, 279, C5-C10.
Polym. Lett. 1965, 3, 703-7.
Chim. Ind. 1971, 53, 939-40.
J. Mol. Catal. 1983, 18, 117-25.

Primary Examiner—James H. Reamer

[57] ABSTRACT

Carbon monoixide, ethylene and optionally at least one olefinically unsaturated organic compound may be polymerized by contacting the monomers in the presence of a catalyst which comprises a Group VIII metal compound of palladium, cobalt or nickel, a bidentate phosphorus, arsenic or antimony ligand and a halide of tin or germanium. The tin or germanium halide is not required when a palladium halide is used as the Group VIII metal compound. The polymers prepared are linear alternating polymers which consist of units with the formula

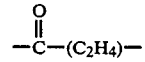

and units having the formula

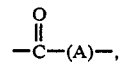

where A is the residue of an alkenically unsaturated organic compound monomer.

30 Claims, No Drawings

CATALYST COMPOSITIONS AND A PROCESS FOR POLYMERIZING CARBON MONOXIDE AND OLEFINS

FIELD OF THE INVENTION

The invention relates to a process for the preparation of polymers of carbon monoxide and at least one olefinically unsaturated organic compound. The invention also relates to the catalyst compositions used in the process of the invention to prepare said polymers.

BACKGROUND OF THE INVENTION

Polymers of carbon monoxide and olefins, such as ethylene, have been known and available in limited quantities for many years. For example, polyketones are disclosed in Kirk-Othmer Encyclopedia of Chemical Technology, Second Edition, Vol. 12, p. 132, 1967, and in Encyclopedia of Polymer Science and Technology, 1968, Vol. 9, 397–402. It is known that polyketones are prepared by contacting CO and ethylene monomers in the presence of a catalyst. High molecular weight polymers of ethylene which contain small quantites of carbon monoxide can be prepared with the aid of Ziegler catalysts. Low molecular weight polymers of carbon monoxide with ethylene and possibly other olefinically unsaturated hydrocarbons in which all monomer units occur distributed at random within the polymer can be prepared with the aid of radical catalysts such as peroxides. A special class of the polymers of carbon monoxide with ethylene is formed by the high molecular weight linear polymers in which the monomer units occur in alternating order and which polymers consist of units with the formula $-CO-(C_2H_4)-$. Such polymers are prepared with the aid of, among others, phosphorus-, arsenic-, antimony-, or cyanogen-containing compounds of palladium, cobalt or nickel as catalysts.

High molecular weight linear alternating polymers of carbon monoxide and ethylene, consisting of units of the formula $-CO-(C_2H_4)-$, can be prepared by using catalyst compositions comprising:

(i) a compound of a Group VIII metal selected from the group consisting of palladium, cobalt and nickel, (ii) a bidentate ligand of the general formula

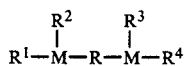

wherein M represents phosphorus, arsenic or antimony, R is a bivalent organic bridging group containing at least two carbon atoms in the bridge and $R^1$, $R^2$, $R^3$ and $R^4$ represent hydrocarbyl groups which may be substituted with polar and nonpolar groups, and (iii) a non-hydrohalogenic acid having a pKa less than 6.

Application of these catalyst compositions to a monomer mixture which, in addition to carbon monoxide, comprises for example ethylene and one or more alkenicallly unsaturated hydrocarbons having the general formula $C_xH_y$ leads to the formation of polymers with units of the formula $-CO-(C_2H_4)-$ and units of the general formula $-CO-(C_xH_y)-$ occurring randomly distributed throughout the polymer chains. The structures of the copolymers and 'terpolymers' only differ in that in the case of the 'terpolymers' a group $-(C_xH_y)-$ is encountered at random places in the polymer instead of a $-(C_2H_4)-$group.

Such polymers can also be prepared by using catalyst compositions based upon:

(1) a compound of a Group VIII metal selected fron the group consisting of palladium, cobalt and nickel, (2) a nitrogen ligand of the general formula

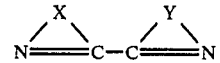

wherein X and Y represent similar or different bridging groups, each containing three or four atoms in the bridge at least two of which are carbon atoms, and (3) an acid with a pKa of less than 6, such as para-toluenesulphonic acid or a metal salt of such an acid, for example a tin or germanium salt.

The activity of catalyst compositions based upon components (1), (2) and (3) is to a great extent dependent on the nature of the component (3). The use of para-toluenesulphonic acid as component (3) yields catalyst compositions with a very attractive activity, but this activity is lost when the paratoluenesulphonic acid is replaced by an hydrohalogenic acid, such as hydrochloric acid. The same phenomenon is encountered upon replacing the para-toluenesulphonic acid by an halide of tin or germanium, such as a chloride, as component (3). This likewise resulted in a total loss of activity in the catalyst composition containing a nitrogen bidentate ligand.

The catalyst compositions based upon components (i)-(iii) having a phosphorus, arsenic or antimony bidentate ligand for component (ii) react to the use of a hydrohalogenic acid for component (iii) in a way analogous to that of the catalyst compositions based upon components (1)-(3) which have a nitrogen bidentate ligand for component (2). In catalyst compositions based upon components (i)-(iii) and having a phosphorus, arsenic or antimony bidentate ligand for component (ii) the use of para-toluenesulphonic acid for component (iii) results in catalyst compositions having a very attractive activity, whereas this activity is lost almost completely when the para-toluenesulphonic acid is replaced by a hydrohalogenic acid, such as hydrochloric acid.

In view of the disappointing results obtained with hydrohalogenic acids as the third component in catalyst compositions containing a nitrogen bidentate ligand or a phosphorus, arsenic or antimony bidentate ligand, as well as the equally disappointing results from the use of halides of tin or germanium as component (3) in the catalyst compositions based on components (1)-(3), it was assumed that halides of tin or germanium would not be suitable for use as the third component in catalyst compositions based on components (i)-(iii).

SUMMARY OF THE INVENTION

In sharp contrast with what was expected on the strength of the above observations it has now been found that catalyst compositions based upon components (i)-(iii), having a phosphorus, arsenic or antimony bidentate ligand for component (ii) and possessing attractive activities for the afore-mentioned polymerization, can be obtained by using a tin or germanium halide as component (iii). It has also been shown that when a palladium halide is used as component (i), catalyst compositions result which in themselves show attractive activities for the polymerization of carbon monoxide with one or more olefinically unsaturated organic compounds, even without a tin or germanium halide being present as component (iii).

The present invention therefore relates to a process for the preparation of polymers, which process comprises contacting carbon monoxide, ethylene and optionally at least one olefinically unsaturated organic compound with a catalyst which comprises (a) a compound of a Group VIII metal selected from the group consisting palladium, cobalt and nickel, (b) a bidentate ligand of the general formula

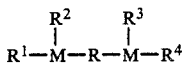

wherein each M independently represents phosphorus, arsenic or antimony, $R^1$, $R^2$, $R^3$ and $R^4$ represent hydrocarbyl groups which may be substituted and R represents a bivalent organic bridging group containing at least two carbon atoms in the bridge, and (c) a halide of tin or germanium.

The invention further relates to the polymers thus prepared and to shaped objects consisting at least partly of polymers thus prepared. The polymers prepared in the process of the invention are linear polymers in which the monomer units occur in alternating order. The polymers prepared from carbon monoxide and ethylene consist of units having the formula

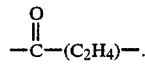

Polymers prepared from carbon monoxide, ethylene and at least one olefinically unsaturated organic compound are linear alternating polymers consisting of units of the formula

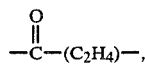

and units having the formula

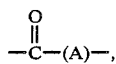

where A is the residue of an alkenically unsaturated organic compound monomer.

DESCRIPTION OF THE INVENTION

A very suitable compound for use as component (a) is a palladium salt of a carboxylic acid and in particular palladium acetate. Other very suitable compounds for use as component (a) are organic complexes containing a palladium halide, in particular palladium chloride. An example of such a complex is a complex of palladium chloride and triarylphosphine, which complex contains 2 mol of triarylphosphine per mol of palladium chloride. When a palladium halide compound is used it is not necessary to use a halide of a tin or germanium as component (c). Suitable catalyst activity will be obtained without adding a component (c) when a palladium halide is used as component (a). If a halide of tin or germanium is added to a catalyst composition comprising a palladium halide the activity of the catalyst will be further enhanced.

In the bidentate ligand used as component (2) each M is preferred to be phosphorus. The groups $R^1$, $R^2$, $R^3$ and $R^4$ present in the bidentate ligand preferably contain 6 to 14 carbon atoms. Special preference is given to bidentate ligands in which the groups $R^1$, $R^2$, $R^3$ and $R^4$ are phenyl groups or substituted phenyl groups. $R^1$, $R^2$, $R^3$ and $R^4$ may also be substituted with polar groups. The bivalent organic bridging group R preferably contains three carbon atoms in the bridge. Examples of suitable bidentate ligands are 1,3-bis(di-p-tolylphosphino)propane, 1,3-bis(di-p-chlorophenylphosphino)propane, 1,3-bis(di-p-methoxyphenylphosphino)propane, 1,3-bis(diphenylphosphino)propane and 2-methyl-2-(methyldiphenylphosphino)-1,3-bis(diphenylphosphino)propane. Either one of the latter two bidentate ligands is preferred. The bidentate ligand is preferably used in a quantity of 0.1-5 and in particular of 0.5-1.5 mol per gram-atom of Group VIII metal.

Optionally components (a) and (b) may be combined for use in a single compound. An example of such a compound is a complex of palladium halide and a phosphorus bidentate ligand in which complex the two components (a) and (b) are present in a molar ratio of 1:1. Such a complex can be prepared, for example, by dissolving palladium acetate in ethanol, then adding to this solution 2 mol of hydrochloric acid per mol of palladium acetate and finally adding to the solution 1 mol of 1,3-bis(diphenylphosphino)propane per mol of palladium chloride, to obtain the complex [1,3-bis(diphenylphosphino)propane]PdCl$_2$.

Preferably the halide of tin or germanium used as component (c) is a chloride. Special preference is given to the use of tin chloride as the component (c). In the catalyst compositions component (c) is preferably present in a quantity of 1-100 mol and in particular 1-50 mol per gram-atom of Group VIII metal.

The polymerization according to the invention is preferably carried out in a liquid diluent as a liquid phase polymerization. Liquid phase polymerization is characterized in that a quantity of diluent is used which is in excess of the polymer formed. Very suitable liquid diluents are lower alcohols such as methanol and ethanol.

Eligible olefinically unsaturated organic compounds that can be polymerized with carbon monoxide according to the invention are compounds which consist exclusively of carbon and hydrogen and compounds which, in addition to carbon and hydrogen, contain one or more hetero-atoms. The polymerization according to the invention is preferably used for preparing polymers of carbon monoxide with ethylene and one or more olefinically unsaturated hydrocarbons. Examples of suitable hydrocarbon monomers are ethylene and other α-olefins, such as propylene, butene-1, hexene-1 and octene-1 as well as styrene and alkyl-substituted styrenes such as p-methylstyrene and p-ethylstyrene. The polymerization according to the invention is particularly suitable for the preparation of copolymers of carbon monoxide with ethylene and for the preparation of terpolymers of carbon monoxide with ethylene and another olefinically unsaturated hydrocarbon, in particular propylene.

The polymers prepared in the process of the invention are linear polymers in which the monomer units occur in alternating order. The polymers prepared from carbon monoxide and ethylene consist of units having the formula

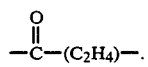

Polymers prepared from carbon monoxide, ethylene and at least one olefinically unsaturated organic compound are linear alternating polymers consisting of units of the formula

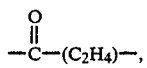

and units having the formula

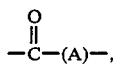

where A is the residue of an alkenically unsaturated organic compound monomer.

The quantity of catalyst used in the preparation of the polymers is not critical. It is preferable to use a quantity of catalyst in the range containing about $1 \times 10^{-7}$ to about $1 \times 10^{-3}$ gram-atom of Group VIII metal per mol of olefinically unsaturated compound to be polymerized. It is more preferred to use a quantity of catalyst in the range containing about $1 \times 10^{-6}$ to about $1 \times 10^{-4}$ gram-atom of Group VIII metal per mol of olefinically unsaturated compound to be polymerized.

The preparation of the polymer is is preferably carried out at a temperature of 20°–200° C. and more preferably at a temperature of 30°–150° C. The preparation of the polymer is preferably carried out at a pressure of 1–200 bar and more preferably at a pressure of 20–100 bar. In the mixture to be polymerized, the preferred molar ratio of the olefinically unsaturated organic compounds relative to carbon monoxide is 10:1–1:5 and in particular 5:1–1:2. The carbon monoxide used in the polymerization according to the invention need not be pure. It may contain such contaminants as hydrogen, carbon dioxide and nitrogen.

The polymers according to the invention have good mechanical properties. They can be processed by means of the usual techniques into, among other things, films, sheets, plates, fibers and molded objects. The low molecular weight polymers in particular may be used as intermediates for the production of plastics, as components in blends with other polymers (such as waxes and greases) and as plasticizers for other polymers. The higher molecular weight polymers have use and utility as premium thermoplastics for fibers, films, injection molding, compression molding or blowing applications. Because of their properties, the higher molecular weight polymers according to the invention are suitable for many applications, such as in the auto industry, for the manufacture of packaging material for the foods and drinks, as constructional and building material, for the manufacture of cables and for a variety of applications in the domestic sphere. In order to modify their characteristics or to strengthen them, the polymers according to the invention can be employed in combination with many other sorts of materials.

The invention will now be illustrated with the aid of the following comparative example and illustrative embodiments.

ILLUSTRATIVE EMBODIMENT 1

A carbon monoxide/ethylene copolymer was prepared as follows. A mechanically stirred autoclave with a volume of 250 ml was charged with a catalyst solution comprising
50 ml of methanol,
0.1 mmol of palladium acetate,
0.15 mmol of 1,3-bis(diphenylphosphino)propane, and
4 mmol of tin chloride ($SnCl_2$).
Carbon monoxide was introduced into the autoclave until a pressure of 30 bar was reached, followed by ethylene until a pressure of 60 bar was reached. Finally the contents of the autoclave were heated to 100° C. After 5 hours the polymerization was terminated by cooling to room temperature and then releasing the pressure. The polymer formed was filtered off, washed with methanol and dried in vacuo at room temperature. 15.0 g of copolymer was obtained.

COMPARATIVE EXAMPLE 2

A carbon monoxide/ethylene copolymer was prepared in substantially the same way as the copolymer of Illustrative Embodiment 1, the differences being:
(a) the catalyst solution contained 0.1 mmol of bis(triphenylphosphine)palladium chloride instead of 0.1 mmol of palladium acetate, and
(b) the catalyst solution contained no 1,3-bis(diphenylphosphino)propane. 0.7 g copolymer was obtained.

ILLUSTRATIVE EMBODIMENT 3

A carbon monoxide/ethylene copolymer was prepared in substantially the same way as the copolymer of Illustrative Embodiment 1, the differences being:
(a) a catalyst solution was used which comprised 50 ml of methanol and a complex of 0.1 mmol of palladium chloride and 0.1 mmol of 1,3-bis(diphenylphosphino)propane, and
(b) the polymerization was terminated after 2.5 hours. 2.1 g of copolymer was obtained.

ILLUSTRATIVE EMBODIMENT 4

A carbon monoxide/ethylene copolymer was prepared in substantially the same way as the copolymer of Illustrative Embodiment 1, except that in this case a catalyst solution was used which comprised
50 ml of methanol,
a complex of 0.1 mmol of palladium chloride and 0.1 mmol of 1,3-bis(diphenylphosphino)propane, and
2 mmol of tin chloride.
5.6 g of copolymer was obtained.

ILLUSTRATIVE EMBODIMENT 5

A carbon monoxide/ethylene copolymer was prepared in substantially the same way as the copolymer of Illustrative Embodiment 1, except that in this case a catalyst solution was used which comprised
50 ml of methanol,
a complex of 0.1 mmol of palladium chloride and 0.1 mmol of 1,3-bis(diphenylphosphino)propane and
4 mmol of tin chloride.
12.0 g of copolymer was obtained.

ILLUSTRATIVE EMBODIMENT 6

A carbon monoxide/ethylene copolymer was prepared in substantially the same way as the copolymer of Illustrative Embodiment 1, the differences being:

(a) a catalyst solution was used which comprised
50 ml of methanol,
a complex of 0.1 mmol of palladium chloride and
0.1 mmol of 1,3-bis(di-para-methoxyphenylphosphino)propane and
4 mmol of tin chloride, and (b) the polymerization was terminated after 1.5 hour.
3.0 g of copolymer was obtained.

ILLUSTRATIVE EMBODIMENT 7

A carbon monoxide/ethylene copolymer was prepared in substantially the same way as the copolymer of Illustrative Embodiment 1, except that in this case a catalyst solution was used which comprised
50 ml of methanol,
a complex of 0.1 mmol of palladium chloride and
0.1 mmol 1,3-bis(di-para-chlorophenylphosphino)propane and
4 mmol of tin chloride.
6.8 g of copolymer was obtained.

The Illustrative Embodiments 1 and 3-7 refer to polymer preparations according to the invention. In Illustrative Embodiments 1 and 4-7 catalyst compositions were used which were based upon a palladium compound, a phosphorus bidentate ligand and tin chloride. In illustrative Embodiment 3 a catalyst composition based upon a palladium halide and a phosphorus bidentate ligand was used. Comparative Example 2, where a catalyst composition was used which contained no phosphorus, arsenic or antimony bidentate ligand, falls outside the scope of the invention; it has been included in the patent application for comparison. Comparison of the results of Illustrative Embodiments 3, 4 and 5 shows that the activity of a catalyst composition based upon a palladium halide and a phosphorus bidentate ligand, which is already attractive in itself, can still be enhanced to a considerable extent by incorporating tin chloride in the composition.

The carbon monoxide/ethylene copolymers prepared according to Illustrative Embodiments 1 and 3-7 had a melting point of 257° C. With the aid of $^{13}$C-NMR analysis it was established that these polymers had a linear alternating structure and thus consisted of units of the formula —CO—(C$_2$H$_4$)—.

What is claimed is:

1. A process to prepare a linear alternating polymer which process comprises contacting carbon monoxide and ethylene in the presence of a catalyst wherein the catalyst is obtained by reacting (a) a compound of a Group VIII metal selected from the group consisting of palladium, cobalt and nickel, (b) a bidentate ligand of the general formula

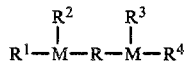

wherein each M is selected from the group consisting of phosphorus, arsenic or antimony, R is a bivalent organic bridging group containing at least two carbon atoms in the bridge and R$^1$, R$^2$, R$^3$ and R$^4$ are independently are hydrocarbon groups or substituted hydrocarbon groups, and (c) a halide selected from the group consisting of halides of tin and germanium and under conditions suitable to prepare a linear alternating polymer.

2. The process of claim 1 wherein M is phosphorus.

3. The process of claim 2 wherein the Group VIII metal compound is a palladium compound.

4. The process of claim 3 wherein in the reaction to obtain the catalyst, the bidentate ligand is present in a quantity from about 0.1 to about 5.0 mol per gram-atom of Group VIII metal.

5. The process of claim 3 wherein in the reaction to obtain the catalyst, the bidentate ligand is present in a quantity from about 0.5 to about 1.5 mol per gram-atom of Group VIII metal.

6. The process of claim 3 wherein the divalent organic bridging group R contains three carbon atoms in the bridge.

7. The process of claim 6 wherein the hydrocarbon groups R$^1$, R$^2$, R$^3$, and R$^4$ each contain 6 to 14 carbon atoms.

8. The process of claim 4 wherein the bidentate ligand is selected from the group consisting of 1,3-bis(diphenylphosphino)propane, and 2-methyl-2-(methyldiphenylphosphino)-1,3-bis(diphenylphosphino)propane.

9. The process of claim 8 wherein the process is carried out by contacting the monomers with a catalyst in the presence of a liquid diluting agent.

10. The process of claim 9 wherein the liquid diluting agent is methanol.

11. The process of claim 6 wherein the catalyst is present in a quantity from about $1 \times 10^{-7}$ to about $1 \times 10^{-3}$ gram atom of Group VIII metal per mol of ethylene.

12. The process of claim 6 wherein the catalyst is present in a quantity from about $1 \times 10^{-6}$ to about $1 \times 10^{-4}$ gram atom of Group VIII metal per mol of ethylene.

13. The process of claim 3 wherein the temperature is from about 20° to about 200° C.

14. The process of claim 13 wherein the pressure is from about about 1 to about 200 bar.

15. The process of claim 7 wherein the monomer mixture from which the polymers are prepared comprises carbon monoxide, ethylene and at least one olefinically unsaturated organic compound.

16. The process of claim 15 wherein the olefinically unsaturated organic compound is a hydrocarbon.

17. The process of claim 16 wherein the olefinically unsaturated organic compound is propylene.

18. The process of claim 15 wherein the catalyst is present in a quantity from about $1 \times 10^{-7}$ to about $1 \times 10^{-3}$ gram atom of Group VIII metal per total mol of ethylene and olefinically unsaturated organic compound.

19. The process of claim 7 wherein the halide of component (c) is a chloride.

20. The process of claim 19 wherein the chloride is tin chloride.

21. The process of claim 3 wherein the halide of component (c) is present in an amount from about 1-100 mol per gram-atom of Group VIII metal.

22. The process of claim 18 wherein the molar ratio of olefinically unsaturated compounds and ethylene relative to carbon monoxide is from about 10:1 to about 1:5.

23. The process of claim 3 wherein component (a) and component (b) are present as one compound.

24. The process of claim 23 wherein component (a) and component (b) are present as a 1:1 complex of a palladium halide and a phosphorus bidentate ligand.

25. A process to prepare a linear alternating polymer which process comprises contacting carbon monoxide and ethylene in the presence of a catalyst wherein the catalyst is obtained by reacting (a) a palladium halide, (b) a bidentate ligand of the general formula

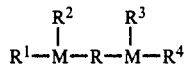

wherein M is phosphorus, R is a bivalent organic bridging group containing three carbon atoms in the bridge and $R^1$, $R^2$, $R^3$ and $R^4$ are are phenyl groups having polar substituents, and (c) a tin chloride and under conditions suitable to prepare a linear alternating polymer.

26. A process to prepare a linear alternating polymer which process comprises contacting carbon monoxide and ethylene in the presence of a catalyst wherein the catalyst is obtained by reacting a palladium halide and a bidentate ligand of the general formula

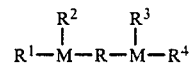

wherein each M is selected from the group consisting of phosphorus, arsenic or antimony, R is a bivalent organic bridging group containing at least two carbon atoms in the bridge and $R^1$, $R^2$, $R^3$ and $R^4$ are independently are hydrocarbon groups or substituted hydrocarbon groups and under conditions suitable to prepare a linear alternating polymer.

27. The process of claim 26 wherein M is phosphorus.

28. The process of claim 27 wherein the palladium halide is palladium chloride.

29. The process of claim 28 wherein the catalyst is present as a 1:1 complex of a palladium halide and phosphorus bidentate ligand.

30. The process of claim 29 wherein the monomer mixture from which the polymers are prepared comprises carbon monoxide, ethylene and at least one olefinically unsaturated organic compound.

* * * * *